(12) United States Patent
Ludwig et al.

(10) Patent No.: US 9,979,661 B2
(45) Date of Patent: May 22, 2018

(54) TECHNIQUES FOR HANDLING NETWORK TRAFFIC

(75) Inventors: Reiner Ludwig, Hürtgenwald (DE); Hannes Ekström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1342 days.

(21) Appl. No.: 13/262,423

(22) PCT Filed: Apr. 2, 2009

(86) PCT No.: PCT/EP2009/053946
§ 371 (c)(1),
(2), (4) Date: Feb. 10, 2012

(87) PCT Pub. No.: WO2010/112077
PCT Pub. Date: Oct. 7, 2010

(65) Prior Publication Data
US 2012/0134264 A1    May 31, 2012

(51) Int. Cl.
*H04L 12/26* (2006.01)
*H04L 12/851* (2013.01)
(Continued)

(52) U.S. Cl.
CPC .......... *H04L 47/2408* (2013.01); *B60R 19/04* (2013.01); *B60R 19/18* (2013.01);
(Continued)

(58) Field of Classification Search
CPC ...... H04L 47/14; H04L 47/20; H04L 47/2048
See application file for complete search history.

(56) References Cited

U.S. PATENT DOCUMENTS 6,286,052 B1    9/2001  McCloghrie et al.
7,272,651 B1 *  9/2007  Bolding et al. ............... 709/227
(Continued)

FOREIGN PATENT DOCUMENTS

EP    1720287 A1    11/2006
JP    2002215481 A    8/2002
(Continued)

OTHER PUBLICATIONS

3rd Generation Partnership Project. 3GPP TS 23.203, V7.5.0 (Dec. 2007). 3rd Generation Partnership Project; Technical Specification Group Services and System Aspects; Policy and charging control architecture (Release 7). Dec. 2007.
(Continued)

*Primary Examiner* — Huy D Vu
*Assistant Examiner* — Teisha D Hall
(74) *Attorney, Agent, or Firm* — Coats & Bennett, PLLC

(57) ABSTRACT

In a mobile communication environment, the data traffic is mapped to a number of bearers (52, 54). In a downlink direction, this is accomplished by filtering data packets on the basis of an identifier which is included into the data packets in response to packet inspection. In the uplink direction, a mirroring function is applied which detects incoming data packets, which are received on one of a plurality of bearers (52, 54) and have a first identifier, and outgoing data packets having a second identifier which is complementary to the first identifier. The outgoing data packets having the complementary second identifier are routed to the same bearer (52, 54) from which the incoming data packets are received.

9 Claims, 8 Drawing Sheets

(51) Int. Cl.
  *B60R 19/04* (2006.01)
  *B60R 19/18* (2006.01)
  *B60R 19/34* (2006.01)
  *H04L 12/801* (2013.01)
  *H04L 12/813* (2013.01)
  *H04W 28/02* (2009.01)
  *H04W 28/22* (2009.01)

(52) U.S. Cl.
  CPC .............. *B60R 19/34* (2013.01); *H04L 47/10* (2013.01); *H04L 47/14* (2013.01); *H04L 47/20* (2013.01); *H04W 28/0263* (2013.01); *H04W 28/22* (2013.01)

(56) References Cited

U.S. PATENT DOCUMENTS

| | | | |
|---|---|---|---|
| 7,283,468 B1 | 10/2007 | Hill et al. | |
| 9,252,972 B1 | 2/2016 | Dukes et al. | |
| 2002/0143939 A1 | 10/2002 | Riddle et al. | |
| 2003/0128708 A1 | 7/2003 | Inoue et al. | |
| 2004/0017825 A1 | 1/2004 | Stanwood et al. | |
| 2004/0109455 A1* | 6/2004 | Jouppi et al. | 370/395.52 |
| 2005/0243837 A1 | 11/2005 | Boyd et al. | |
| 2006/0077989 A1 | 4/2006 | Lu et al. | |
| 2006/0103862 A1* | 5/2006 | Kurumisawa et al. | 358/1.9 |
| 2006/0153080 A1 | 7/2006 | Palm | |
| 2006/0164969 A1* | 7/2006 | Malik et al. | 370/203 |
| 2007/0081499 A1 | 4/2007 | Johnsen | |
| 2007/0104132 A1 | 5/2007 | Rajagopalan et al. | |
| 2007/0127487 A1 | 6/2007 | Kim et al. | |
| 2007/0242627 A1 | 10/2007 | Thai et al. | |
| 2007/0249339 A1 | 10/2007 | Tamura et al. | |
| 2008/0002592 A1* | 1/2008 | Yegani et al. | 370/252 |
| 2008/0076432 A1 | 3/2008 | Senarath et al. | |
| 2008/0107084 A1 | 5/2008 | Pichna et al. | |
| 2008/0267085 A1 | 10/2008 | Bae et al. | |
| 2008/0310334 A1 | 12/2008 | Nakamura et al. | |
| 2009/0016282 A1 | 1/2009 | Gasparroni et al. | |
| 2009/0193469 A1 | 7/2009 | Igarashi | |
| 2009/0238192 A1* | 9/2009 | Dolganow et al. | 370/400 |
| 2010/0142373 A1 | 6/2010 | Jin et al. | |
| 2010/0157831 A1 | 6/2010 | Takeuchi et al. | |
| 2010/0268763 A1* | 10/2010 | Rasanen | 709/203 |
| 2011/0286331 A1* | 11/2011 | Lauer | 370/235 |
| 2011/0314145 A1 | 12/2011 | Raleigh et al. | |
| 2012/0076047 A1 | 3/2012 | Turanyi et al. | |

FOREIGN PATENT DOCUMENTS

| | | |
|---|---|---|
| JP | 2003209573 A | 7/2003 |
| JP | 2006503501 A | 1/2006 |
| JP | 2008311974 A | 12/2008 |
| JP | 2010166141 A | 7/2010 |
| WO | 2004036849 A2 | 4/2004 |
| WO | 2007/079773 A1 | 7/2007 |
| WO | 2007/087828 A1 | 8/2007 |
| WO | 2007102550 A1 | 9/2007 |
| WO | 2008102442 A1 | 8/2008 |
| WO | 2010074619 A1 | 7/2010 |

OTHER PUBLICATIONS

DSL Home-Technical Working Group, "CPE WAN Management Protocol", DSL Forum TR-069, Technical Report, May 2004, pp. 1-109, available at https://www.broadband-forum.org/technical/download/TR-069.pdf.

Broadband Forum, "WT-134, Broadband Policy Control Framework (BPCF)", Draft, Jul. 2010, pp. 1-73, Version 22, The Broadband Forum.

* cited by examiner

IDENTIFIER

| SOURCE ADDRESS | DESTINATION ADDRESS | SOURCE PORT | DESTINATION PORT | PROTOCOL ID |
|---|---|---|---|---|
| A | B | C | D | X |

COMPLEMENTARY IDENTIFIER

| SOURCE ADDRESS | DESTINATION ADDRESS | SOURCE PORT | DESTINATION PORT | PROTOCOL ID |
|---|---|---|---|---|
| B | A | D | C | X |

FIG. 7

TECHNIQUES FOR HANDLING NETWORK TRAFFIC

TECHNICAL FIELD

The present invention relates to techniques for handling network traffic.

BACKGROUND

In mobile communication networks it is known to direct network traffic related to a specific service to a bearer with a certain quality of service (QoS). In this respect, a bearer is considered to be an information transmission context or path of defined characteristics, e.g. capacity, delay and/or bit error rate. Typically, a number of bearers will be established between a gateway of a mobile communication network and a user equipment, e.g. a mobile phone or other type of mobile terminal. A bearer may carry downlink (DL) data traffic in a direction from the network to the user equipment, and may carry data traffic in an uplink (UL) direction from the user equipment to the network. In the gateway and in the user equipment the data traffic, which includes a plurality of IP data packets (IP: "Internet Protocol") can be filtered using IP 5-tuple packet filters, thereby directing the IP data packets to a desired bearer.

Specifically, it is desired to direct data traffic relating to a specific service, e.g. mobile TV, to a bearer offering a certain QoS. For this purpose, DL data traffic may be subjected to a packet inspection so as to identify data packets relating to a specific service. When data packets of a predefined service are detected, this may be signalled to a policy controller. The policy controller may then generate corresponding packet filters and signal these packet filters to the gateway. The gateway then uses the received packet filters to route the data packets to a desired bearer. The bearer typically has a QoS class which was chosen by the network operator for the specific service. In this process, there may also be signalling to the user equipment, e.g. for establishing the bearer and indicating UL packet filters to the user equipment, which should be used to route UL data traffic onto the bearer.

However, the known solution may have problems in that a service may frequently open or close IP packet flows associated with the same service, e.g. as done by certain peer-to-peer file sharing applications. In this case, the result would be extensive signalling so as to establish the packet filters for routing the data packets onto the desired bearer. In addition, the routing of DL data traffic using IP 5-tuple based packet filters requires significant processing resources in the gateway. Further, it may in some cases be difficult or impossible for a packet inspection function to sufficiently describe IP packet flows associated with a specific service and to signal this to the policy controller. For example, this may be the case if the IP packet flows are encrypted or if the service is associated with a large number of IP packet flows, e.g. in the case of certain peer-to-peer file sharing applications.

Accordingly, there is a need for powerful and efficient techniques for handling network traffic, which allow for assigning data traffic of a specific service a desired QoS level.

SUMMARY

According to an embodiment of the invention, a method of handling network traffic is provided. The method includes receiving packet inspection data indicating service-related data traffic of at least one of a specific user and a specific service, receiving policy data of the at least one of the user and the service, and determining a packet filter on the basis of the packet inspection data and the policy data. The packet filter is configured to filter data traffic on the basis of an identifier included into the data packets of the service-related data traffic in response to packet inspection.

According to a further embodiment of the invention, a network component is provided. The network component includes a packet inspection data interface configured to receive packet inspection data indicating service-related data traffic of at least one of a specific user and a specific service, and a policy controller configured to receive policy data pertaining to the at least one of the user and the service. In addition, the network component includes a filter generator configured to determine a packet filter on the basis of the packet inspection data and the policy data, the packet filter being configured to filter data traffic on the basis of an identifier included into data packets of the service-related data traffic in response to packet inspection.

According to a further embodiment of the invention, a method of handling network traffic is provided. The method includes receiving incoming data packets from one of a plurality of bearers, the data packets including a first identifier. The method further includes detecting outgoing data packets including a second identifier which is complementary with respect to the first identifier, and routing the detected outgoing data packets having the second identifier to the same bearer from which the incoming data packets having the first identifier are received.

According to a further embodiment of the invention, a communication device is provided. The communication device, which may be a user equipment or a network component, includes a receiver configured to receive incoming data packets from a plurality of bearers and a transmitter configured to send outgoing data packets on the plurality of bearers. Further, the communication device includes a mirroring function configured to detect incoming data packets including a first identifier and outgoing data packets including a second identifier which is complementary with respect to the first identifier, and to filter the outgoing data packets in such a way that the outgoing data packets having the second identifier are routed to the same bearer from which the incoming data packets having the first identifier are received.

BRIEF DESCRIPTION OF THE DRAWINGS

FIG. 7 schematically illustrates an identifier and a complementary identifier in data packets.

DETAILED DESCRIPTION OF EMBODIMENTS

In the following, the invention will be explained in more detail by referring to exemplary embodiments and to the accompanying drawings. The illustrated embodiments relate to handling data traffic in a mobile communication network, e.g. according to the 3GPP (Third Generation Partnership Project) specifications. However, it is to be understood that the concepts as described herein may also be applied to other types of communication networks. In connection with FIG. 1-5, concepts for handling DL data traffic, i.e. toward a user equipment, will be described. In connection with FIGS. 6-8, concepts for handling UL data traffic, i.e. from a user equipment, will be described. Concepts of handling DL data traffic and concepts of handling UL data traffic will thus be described separately. Nonetheless, it is to be understood that these concepts may be applied separately or in combination.

Figure 1:
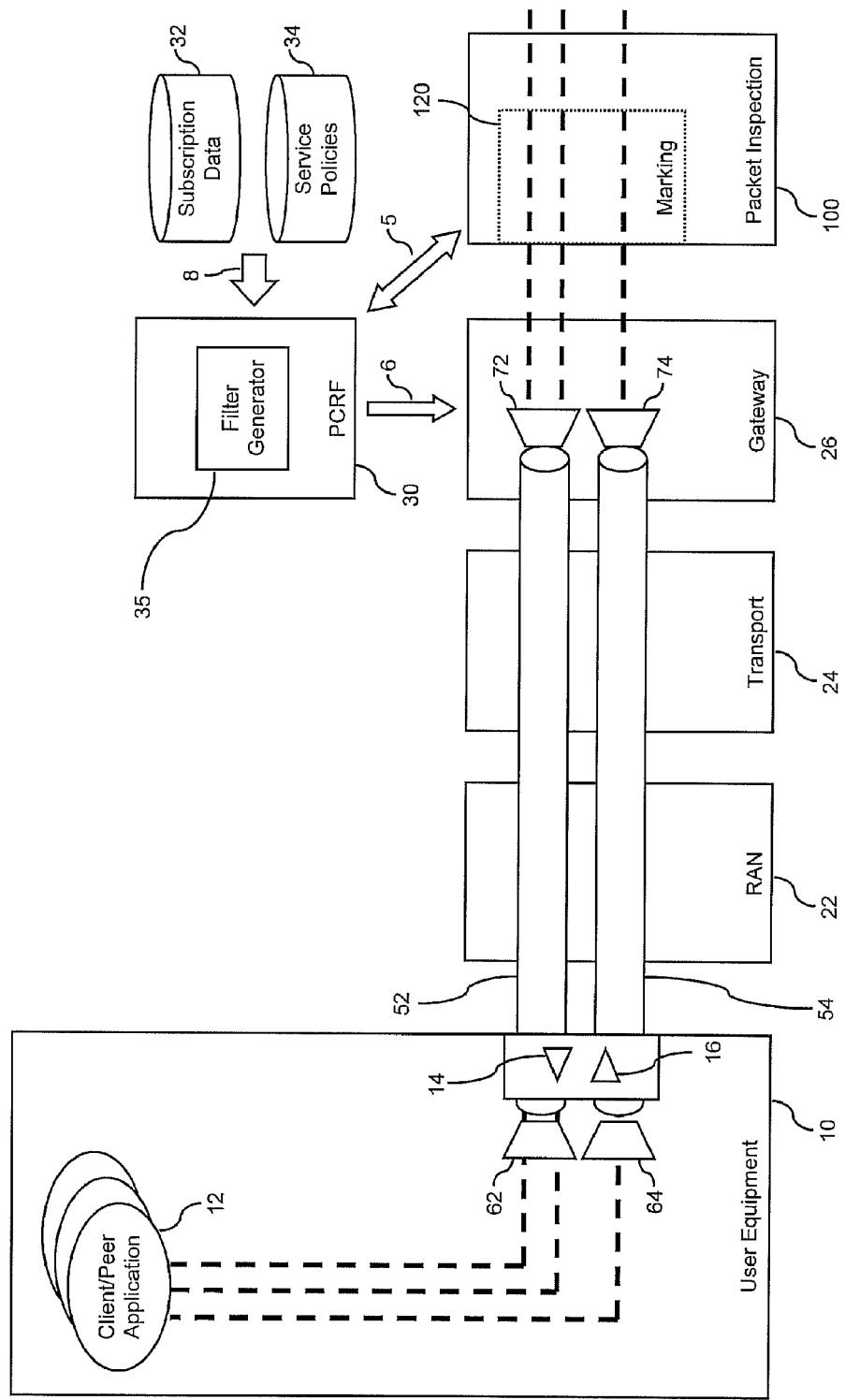
FIG. 1 schematically illustrates a mobile communication environment in which concepts according to embodiments of the invention may be applied for handling DL data traffic.

FIG. 1 schematically illustrates a mobile communication environment in which DL data traffic is handled in accordance with an embodiment of the invention.

The network environment includes a user equipment 10, which may also be referred to as a terminal, and a number of network components 22, 24, 26, 30, 100. Among these network components there is a Radio Access Network (RAN) 22. The RAN is based on a certain type or certain types of radio access technology, e.g. GSM (Global System for Mobile Communications), EDGE (Enhanced Data Rate for GSM Evolution), or UMTS (Universal Mobile Telecommunications System). Although the RAN 22 is illustrated as a single node, it is to be understood that the RAN 22 may actually be formed of a number of components, which are not further explained herein. The RAN 22 is coupled to a transport node 24, which in turn is coupled to a gateway 26. Here, it is to be understood that alternatively more than one transport node 24 may be coupled between the RAN 22 and the gateway 26 or that the RAN 22 may be directly coupled to the gateway 26. The gateway 26 may be a Gateway GPRS Support Node (GGSN) providing a connection of GPRS-based services (GPRS: "General Packet Radio Service") to one or more external packet data networks. The gateway 26 may also be a System Architecture Evolution Gateway (SAE GW) according to the 3GPP specifications.

In addition, the mobile communication network includes a policy controller 30, which is implemented as a Policy and Charging Rules Function (PCRF) according to the 3GPP specifications, and a packet inspector 100. The policy controller may be implemented by dedicated hardware or as a software function executed by a processor. The packet inspector 100 may be implemented by dedicated hardware or as a software function executed by a processor. The packet inspector 100 may be configured to implement a Deep Packet Inspection (DPI), which may be based on examining both a header section and a data section of a data packet. Further, the inspection may also be based on collecting heuristic measures such as packet interarrival time, sending patterns and packet size. Such heuristics can even be applied in case of encryption. Header sections and data sections may be examined on different protocol layers, e.g. on application layer or lower layers, in order to identify different services and protocols. The inspection can also be performed with respect to control signalling relating to sessions. However, other types of packet inspection processes can be implemented as well, e.g. merely based on an inspection of a header section.

The gateway 26, the policy controller 30, and the packet inspector 100 are typically regarded as components of a core network.

The policy controller 30 communicates with the packet inspector 100 via a signalling path 5. The signalling path 5 may be implemented using the Rx interface or the Gx interface according to the 3GPP specifications. Further, the policy controller 30 communicates with the gateway 26 via a signalling path 6, which may be implemented using the Gx interface according to the 3GPP specifications.

The policy controller 30 is further coupled to a subscription database 32 and to a service policy database 34 via a signalling path 8, e.g. implemented using a Sp interface according to the 3GPP specifications. The policy controller 30 may thus receive policy data relating to a specific user and/or relating to a specific service available in the mobile communication network, e.g. mobile TV.

The policy controller 30 thus provides interfaces for supporting the signalling paths 5, 6, 8.

As further illustrated, service-related data traffic between the network and the user equipment 10 is carried by a number of bearers 52, 54. The service-related data traffic typically pertains to one or more client/peer applications 12 running on the user equipment 10. The bearers 52, 54 are established between the user equipment 10 and the gateway 26. The bearers 52, 54 carry data traffic in both the DL direction and the UL direction, i.e. may also be regarded as being formed of a DL bearer and a UL bearer. For supporting bidirectional communication on the bearers 52, 54, the user equipment 10 is provided with a transceiver structure, i.e. both a receiver 14 for receiving incoming data packets from the bearers 52, 54 and a transmitter 16 for sending outgoing data packets on the bearers 52, 54. The bearers 52, 54 may include a default bearer generally established for offering packet-based services to the user equipment 10 and one or more dedicated bearer 54 which may have different QoS level, e.g. a higher QoS level, than the default bearer. Each bearer 52, 54 may be associated with a corresponding QoS profile. Parameters of the QoS profile may be a QoS class identifier (QCI), an allocation/retention priority (ARP), a maximum bit rate (MBR), and/or a guaranteed bit rate (GBR). Accordingly, each bearer 52, 54 may be associated with a corresponding QoS class.

In the user equipment 10, the data packets are routed to a desired bearer 52, 54 using correspondingly configured UL packet filters 62, 64. In the gateway 26, the data packets are routed to the desired bearers 52, 54 using correspondingly configured DL packet filters 72, 74. Parameters of the QoS profile may be signalled from the policy controller 30 to the gateway 26 using the signalling path 6. Similarly, the DL packet filters 72, 74 to be used in the gateway 26 may be signalled from the policy controller 30 to the gateway 26 via the signalling path 6. As regards the UL packet filters 62, 64 used in the user equipment 10, these may be signalled from the policy controller 30 via the gateway 26. However, in some embodiments as further explained in connection with FIGS. 6-8, the UL packet filters 62, 64 may also be generated in response to data traffic received in the user equipment 10.

In the mobile communication network as illustrated in FIG. 1, DL data traffic of the user equipment 10 passes the packet inspector 100 before being received by the gateway 26. The packet inspector 100 identifies data packets pertaining to one or more pre-defined services and/or pertaining to a specific user. This may be accomplished on the basis of packet inspection control data received from the policy controller 30. If data packets pertaining to a specific predefined service are identified, the packet inspector 100 provides a respective indication to the policy controller 30 by sending packet inspection data. In addition, the packet inspector 100 includes a marking function 120, which includes an identifier into the inspected data packet. The marking function 120 may be implemented by dedicated hardware or as a software function running on a processor. The identifier is selected in accordance with the identified service to which the data packet pertains. For example, data packets pertaining to a certain file sharing service may be provided with a first identifier, and data packets pertaining to a certain media streaming service may be provided with a second identifier. Including the identifier into the data packets, or marking the data packets, is thus accomplished on the basis of a packet inspection result or may even be part of the packet inspection process. The identifier may be included into the data packets by setting an information field in a header section of the data packet, e.g. by setting a specific differentiated services code point (DSCP). The mapping of a specific service to a corresponding identifier may be dynamically controlled by the policy controller 30 using the packet inspection control data. In this way, the mapping between a specific service to a corresponding identifier may be dynamically controlled on the basis of policy data. For example, the mapping could vary depending on the time of day or on the day of week.

On the basis of the packet inspection data received from the packet inspector 100 and on the basis of policy data, the policy controller 30 controls the selection and/or configuration of the DL packet filters 72, 74 used in the gateway 26 for routing data packets to desired bearers 52, 54. For this purpose, the policy controller 30 includes a filter generator 35. The filter generator may be implemented by dedicated hardware or as a software function executed by a processor. The filter generator 35 may construct the DL packet filters, select preconfigured DL packet filters from a list, and/or configure selected DL packet filters. The DL packet filters 72, 74 filter the DL data traffic on the basis of the identifier which is included into the data packets by the packet inspector 100. This allows for a highly efficient and reliable filtering process, since the DL packet filters 72, 74 merely need to take into account the identifier included by the packet inspector 100. For example, if the identifier is a DSCP in the header section of the data packets, the DL packet filters 72, 74 merely need to analyze the DSCP information field in the header section of the data packets. In this way, data traffic pertaining to a specific service may be dynamically routed to a desired bearer 52, 54 with a corresponding QoS class.

In the following, concepts of marking inspected data packets will be explained in more detail by referring to exemplary types of data packets.

Figure 2:
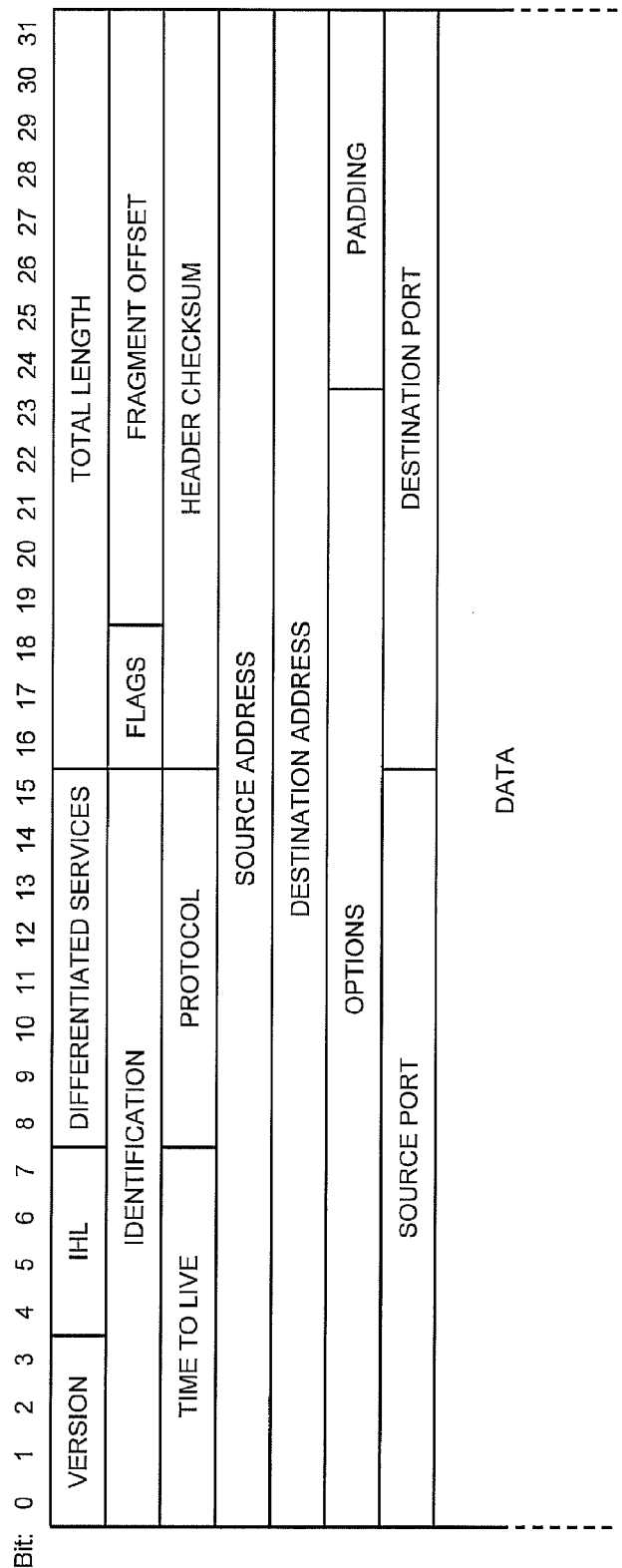
FIG. 2 schematically illustrates an example of a data packet as used in an embodiment of the invention.

FIG. 2 schematically illustrates IP data packets of the IP version 4 type. As illustrated, a header section of the data packets includes several information fields, which are referred to as "Version", "IHL (IP Header Length)", "Differentiated Services", "Total Length", "Identification", "Flags", "Fragment Offset", "Time to Live", "Protocol", "Header Checksum" "Source Address", "Destination Address", "Options", and "Padding". Details concerning these fields are defined in the RFC 791 Specification. The information field termed as "Differentiated Services" is defined in the RFC 2475 Specification. In addition, the header section of an IP data packet will also include information fields which are referred to as "Source Port" and "Destination Port". Corresponding information fields are defined, for example, by the Transport Control Protocol (TCP) defined in the RFC 793 Specification and the User Datagram Protocol (UDP) as defined in the RFC 768 Specification.

Following the header section, IP data packets are typically provided with a data section, in which different types of payload data traffic may be included.

Figure 3:
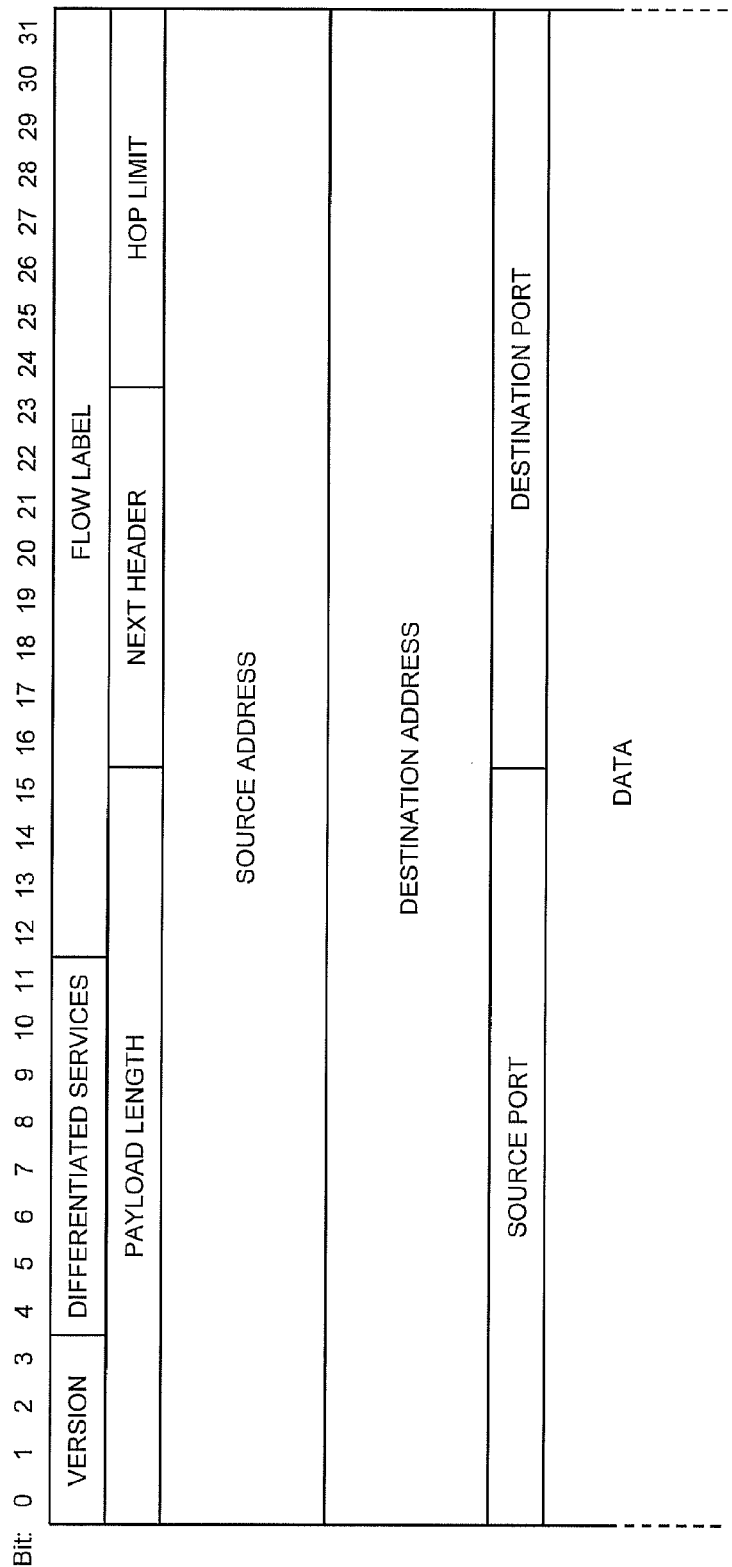
FIG. 3 schematically illustrates a further example of a data packet as used in an embodiment of the invention.

FIG. 3 schematically illustrates IP data packets according to the IP version 6 type. Again, the header section includes a number of information fields, which are referred to as "Version", "Differentiated Services", "Flow Label", "Payload Length", "Next Header", "Hop Limit", "Source Address", and "Destination Address". This structure of the header section is defined in the RFC 2460 Specification. In addition, the header section may also comprise information fields termed as "Source Port" and "Destination Port", e.g. as defined by the TCP or UDP. Again, the header section will typically be followed by a data section which may carry various types of payload data.

For the purposes of the present disclosure, only the information fields referred to as "Differentiated Services", "Source Address", "Destination Address", "Source Port", and "Destination Port" will be further discussed. As regards the other information fields, further explanations can be taken from the above-mentioned RFC Specifications.

The information field "Source Address" indicates the IP address from which a data packet originates. Similarly, the information field "Destination Address" indicates the IP address for which the data packet is destined. In IP version 4, the source address and the destination address are 32 bit values. In IP version 6, the source address and the destination address are 128 bit values.

The information field "Source Port" indicates a port number at the source of the data packet, whereas the information field "destination port" indicates a port number at the destination point of the data packet.

On the basis of the source address, the destination address, the source port, and the destination port, an IP packet flow can be defined as a flow of IP packets between a first endpoint defined by the source address and the source port, and a second endpoint defined by the destination address and the destination port. An entity including the source address, the destination address, the source port, the destination port and a protocol identifier is also referred to as "IP 5-tuple".

The information field "Differentiated Services" is included in both IP version 4 data packets and in IP version 6 data packets. As defined in the RFC 2474 Specification, the information field "Differentiated Services" is an 8 bit value. The structure of this information field is schematically illustrated in FIG. 4.

Figure 4:
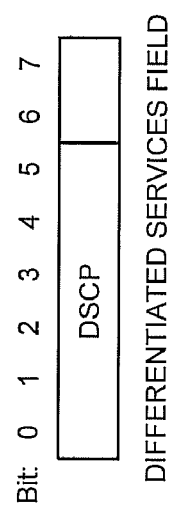
FIG. 4 schematically illustrates an information field in a header section of data packets.

As illustrated in FIG. 4, six bits of the information field, i.e. bits 0-5, are used to define the Differentiated Services Code Point (DSCP). The other two bits are unused. Using the DSCP, forwarding of the data packets by network nodes may be controlled. For data packets pertaining to different types of services different forwarding procedures may be selected. DSCPs may be standardized. Further, a range of non-standardized DSCPs is available.

In the following, a process of handling DL data traffic in accordance with an embodiment of the invention will be described in more detail. This will be accomplished by referring to the mobile communication network environment as illustrated in FIG. 1.

As mentioned above, the mobile communication network may support a number of QoS classes associated with different bearers. The QoS classes may be identified by a corresponding QCI. For marking identified data packets of a specific service in the packet inspector 100, a dedicated DSCP is defined, e.g. from the range of non-standardized DSCPs. As a result, there can be a dedicated DSCP for each bearer.

Further, a mapping table is defined which maps each service to be detected by the packet inspector 100 to a dedicated DSCP. Different dedicated DSCPs may thus be used for marking data packets pertaining to different services. However, it is also possible that data packets of different services are marked with the same DSCP, e.g. if these services should be assigned to the same QoS class. This mapping table may be maintained by the policy controller 30 and further be communicated to the packet inspector 100, e.g. using the signalling path 5. Alternatively, the packet inspector 100 may also be statically configured with the mapping table. If the mapping table in the packet inspector 100 is dynamically configurable by the policy controller 30, it is also possible to reconfigure the mapping table on the basis of policy data. For example, the mapping table could be reconfigured depending on the time of day or depending on the day of week.

If the packet inspector 100 detects an IP packet flow pertaining to a pre-defined service, this is signalled to the policy controller 30 in the packet inspection data. Further, the marking function 120 of the packet inspector 100 marks the data packets pertaining to the service with the DSCP as defined in the mapping table. For other data packets, i.e. data packets which are not identified as pertaining to a pre-defined service, a default DSCP may be set. For example, the default DSCP may be zero. As an alternative, setting of a DSCP may be omitted for data packets which are not identified as pertaining to a pre-defined service. In the packet inspection data, the packet inspector 100 may also signal a service identifier to the policy controller 30. By means of the service identifier, the identified service and/or the DSCP used for marking the corresponding data packets may be signalled to the policy controller 30. The frequency or event-based triggering of signalling towards the policy controller 30 may be appropriately selected.

In response to the packet inspection data, the policy controller 30 determines a DL packet filter which operates on the basis of the DSCP used for marking the data packets of the identified service. According to an embodiment, the DL packet filter may operate substantially only on the basis of the DSCP used for marking the data packets. The DL packet filter is signalled to the gateway 26.

Using the DL packet filter, the gateway 26 then routes DL data packets which are marked with the DSCP to the corresponding bearer 52, 54. The bearer 52, 54 may be already existing. If the bearer is not existing, it may be established upon receiving the signalling from the policy controller 30. That is to say, if a bearer 52, 54 having the QoS class associated with the DSCP is already established, the DL packet filter will route the filtered data packets to this already existing bearer. If no such bearer is existing, a bearer of the QoS class associated with the DSCP will be established upon receiving the signalling of the DL packet filter from the policy controller 30.

Figure 5:
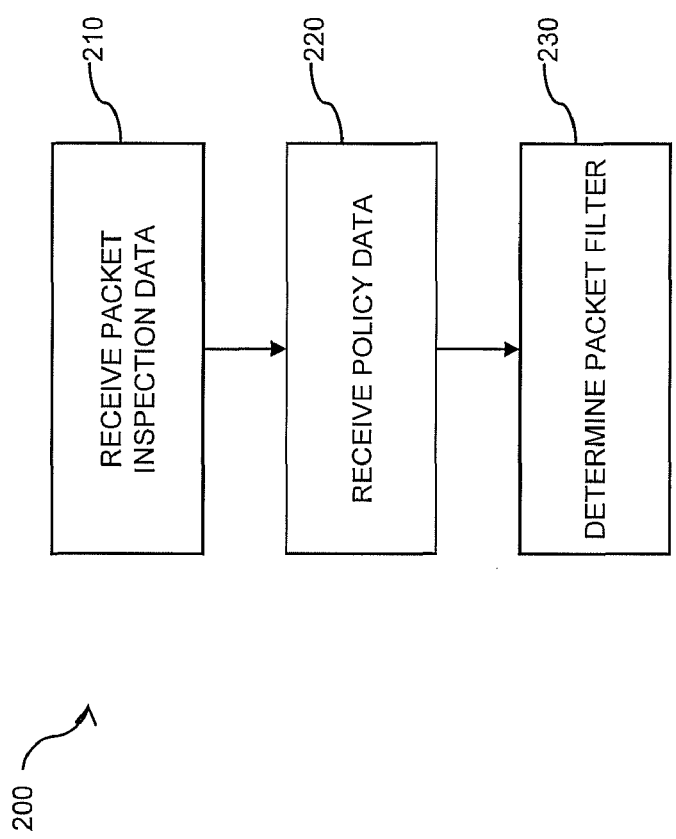
FIG. 5 shows a flowchart for illustrating a method of handling DL data traffic according to an embodiment of the invention.

FIG. 5 shows a flowchart for schematically illustrating a method 200 of handling DL data traffic in accordance with the above-mentioned concepts.

In step 210, packet inspection data are received, e.g. in the policy controller 30. The received packet inspection data may include a service identifier which indicates a service to which identified data packets pertain. Further, the packet inspection data may indicate an identifier which is used for marking the data packets in response to packet inspection, e.g. a dedicated DSCP.

In step 220, policy data are received. The policy data may include general policies defined by an operator of a mobile communication network how to handle data packets of a specific service, or may be user-related, i.e. define how to handle data packets of a specific service and a specific user. The policy data may also distinguish between different subscriber groups or may define a volume quota of a user, subscriber, subscriber group or service. Specifically, the policy data may indicate which quality of service class should be given to data packets pertaining to a specific service. This information may vary dynamically, e.g. on the basis of the time of day, the day of week, or used volume quota.

In step 230, a DL packet filter is determined on the basis of the packet inspection data and the policy data. In particular, a DL packet filter is determined which operates on the basis of an identifier included into the data packets in response to the packet inspection process. The DL packet filter is then used for routing the marked data packets to a bearer having the desired QoS class. For this purpose, the determined DL packet filter may be signalled from a policy controller, e.g. the policy controller 30, to a gateway, e.g. the gateway 26.

Figure 6:
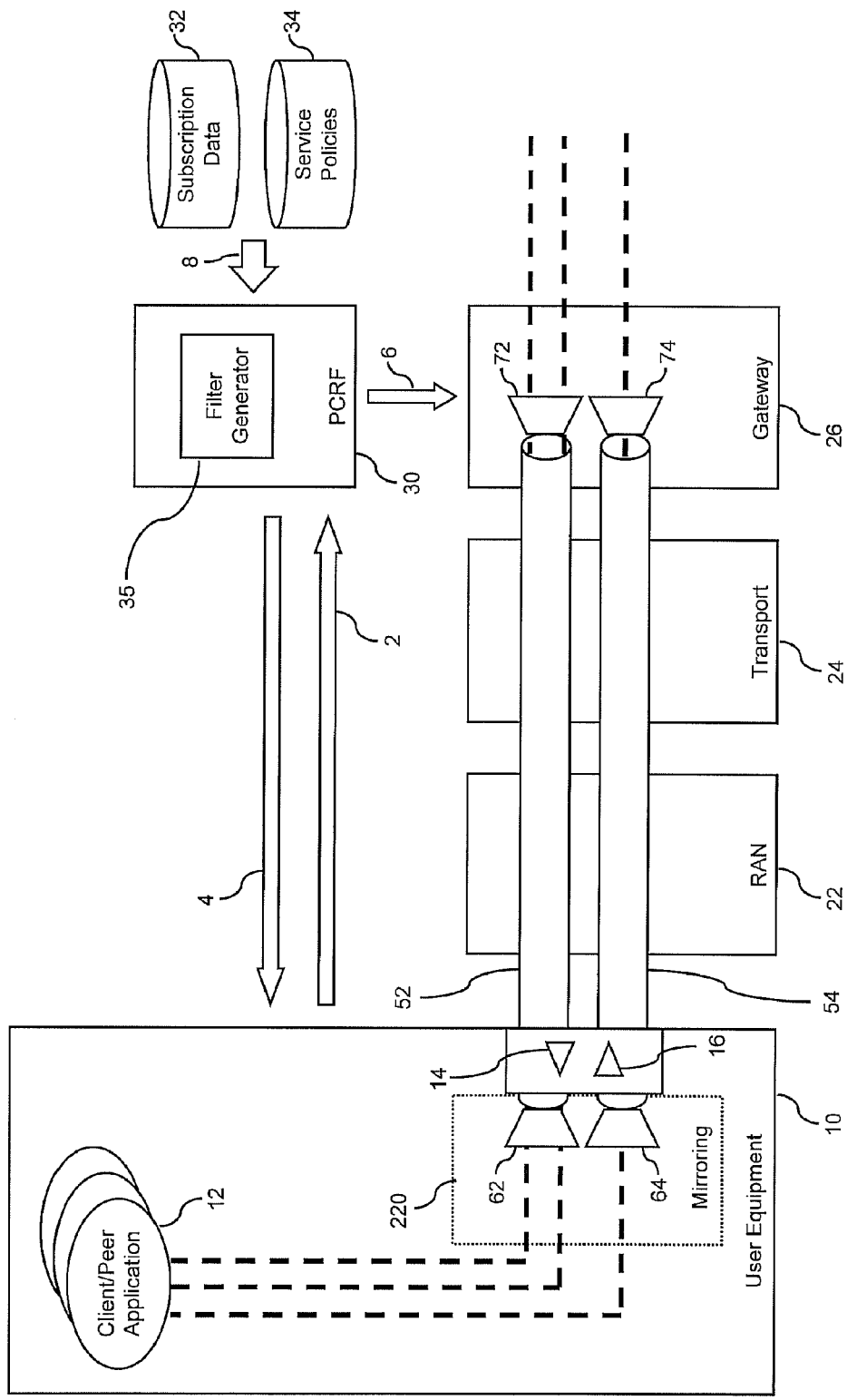
FIG. 6 schematically illustrates a mobile communication environment in which concepts according to embodiments of the present invention may be applied for handling UL data traffic.

FIG. 6 schematically illustrates a mobile communication environment in which UL data traffic is handled in accordance with an embodiment of the invention. The mobile communication environment of FIG. 6 is generally similar to that of FIG. 1, and similar components have been designated with the same reference signs. For further details, reference is made to the corresponding explanations in connection with FIG. 1.

According to the concepts as illustrated in FIG. 6, information in DL data packets is used in the user equipment 10 to form local rules for routing UL data packets. Here, it is to be noted that in a mobile communication scenario, a flow of IP data packets is typically bi-directional. Even if the transport of payload data occurs in only one direction, e.g. on the basis of TCP packets, the IP packet flow will typically also include control packets, e.g. TCP acknowledgement packets, transmitted in the opposite direction. Further, the source and destination IP addresses and port numbers of an IP packet flow are typically symmetrical, i.e. the destination endpoint (identified by an IP address and port number) in one direction is the same as the source endpoint (identified by IP address and port number) in the other direction, and vice versa. Due to the symmetry, oppositely flowing packets of the same IP packet flow will have "complementary" address identifiers, and "complementary" port identifiers, which means that the source identifier in one direction is the same as the destination identifier in the other direction.

According to the concepts of handling UL data traffic as explained in the following, it will be assumed that DL data traffic is already mapped to QoS classes and corresponding bearers. This may be accomplished according to the concepts as explained above in connection with FIG. 1. That is to say, the mobile communication environment of FIG. 6 could also include the packet inspector 100 and associated functionalities for handling DL data traffic as explained in connection with FIG. 1. Nonetheless, it is to be understood that other concepts of mapping DL data traffic to QoS classes and bearers are applicable as well.

As illustrated in FIG. 6, the user equipment 10 further includes a mirroring function 220. The mirroring function 220 may be implemented by dedicated hardware or as a software function running on a processor. The mirroring function 220 is configured to detect incoming data packets including a first identifier and outgoing data packets including a second identifier which is complementary with respect to the first identifier. In the complementary identifier, a destination endpoint identifier, e.g. destination IP address and/or destination port, is the same as a source endpoint identifier, e.g. source IP address and/or source port, in the identifier. The first and the second identifier may each be the IP 5-tuple. The mirroring function 220 controls the UL packet filters 62, 64, which are IP 5-tuple based, in such a way that the outgoing data packets having the complementary second identifier are routed to the same bearer from which the incoming data packets having the first identifier are received. In this way, no explicit signalling between the gateway 26 and the user equipment 10 is necessary for selecting or configuring the UL packet filters 62, 64. If the mirroring function 220 detects that a new IP packet flow has been mapped onto a bearer 52, 54 or a new bearer 52, 54 is established, the mirroring function 220 may automatically generate a corresponding UL packet filter 62, 64. If incoming data packets in the DL direction are identified by a specific IP 5-tuple, the UL packet filter 62, 64 will be configured to route outgoing data packets carrying a complementary IP 5-tuple to the same bearer from which the incoming data packets are received.

The structure of an identifier and a complementary identifier, which are based on the IP 5-tuple, are illustrated in FIG. 7. However, it is to be understood that other types of identifiers and complementary identifiers are possible as well. In general, the complementary identifier indicates the source identified in the identifier of an incoming data packet as the destination of an outgoing data packet.

As shown in FIG. 7, an identifier on the basis of the IP 5-tuple may include a source address A, a destination address B, a source port C, a destination port D, and a protocol identifier X. The corresponding complementary identifier will then have a source address B, a destination address A, a source port D, a destination port C, and a protocol identifier X. In other words, in the complementary identifier the source address and the destination address are swapped as compared to the identifier. Similarly, in the complementary identifier the source port and the destination port are swapped as compared to the identifier. The protocol identifier remains unchanged. In other embodiments, different types of identifier and complementary identifier may be used, e.g. on the basis of only a part of the IP 5-tuple. For example, in the complementary identifier, only the source address and the destination address could be swapped as compared to the identifier.

In the following, a process of handling UL data packets in accordance with an embodiment of the invention will be explained in more detail by referring to the structures as shown in FIG. 6.

Initially, UL data packets relating to a specific service may be transmitted from the user equipment 10 to the gateway 26 on an arbitrary bearer, e.g. on the default bearer. The corresponding IP packet flow will then also include data packets transmitted in the DL direction. These data packets will be mapped to a desired QoS class and the corresponding bearer 52, 54, e.g. using the concepts as explained in connection with FIG. 1. This process may also involve establishing a new bearer associated with the desired QoS class.

The mirroring function 220 in the user equipment 10 then detects the incoming data packets which are received from this bearer 52, 54 and generates a "mirrored" UL packet filter 62, 64, operating on the basis of an IP 5-tuple which is complementary to an IP 5-tuple in the received incoming data packets. Here, it is to be understood that different IP packet flows may be present on a single bearer 52, 54 and that multiple UL packet filters 62, 64 may route outgoing data packets onto the same bearer 52, 54. If there is a new IP packet flow with incoming data packets on a bearer 52, 54 or a new bearer is established, a corresponding new UL data packet filter 62, 64 will be generated.

When applying the above-mentioned concepts, the user equipment 10 may be provided with a functionality to indicate to the mobile communication network that it supports the mirroring function 220. For example, this could be included into session management signalling, e.g. during an attach procedure between user equipment 10 and core network. By way of example, an information element could be added to the signalling process, in which the user equipment 10 can indicate that it supports the mirroring function 220. FIG. 6 schematically illustrates a corresponding signal path 2 extending from the user equipment 10. Here, it is to be understood that the signalling path 2 is schematically represented as extending from the user equipment 10 directly to a specific network node, e.g. to the policy controller 30 as illustrated, but typically may be implemented via other network nodes. For example, in an UMTS communication network, the signalling path 2 could extend from the user equipment 10 to a Serving GPRS Support Node (SGSN). In a Long Term Evolution/Service Architecture Evolution (SAE/LTE) communication network, the signalling path 2 could extend from the user equipment 10 to a Mobile Management Entity (MME). From these network nodes, the signalling information can then be forwarded or distributed to other network nodes, e.g. the policy controller 30.

In some embodiments, the information that the user equipment 10 supports the mirroring function 220 may also be distributed between core network nodes, e.g. to the policy controller 30 or to a node supporting a packet inspection function, e.g. the packet inspector 100 as shown in FIG. 1. For this purpose, the Gx interface or the Rx interface according to the 3GPP Specifications may be re-used.

According to some embodiments, a further signalling path 4 may be provided from the mobile communication network to the user equipment 10. Using this signalling path 4, it may be possible to activate or deactivate the mirroring function 220 on a per bearer basis. This may be useful if not all applications or services require this function to be activated. For example, in some cases the IP 5-tuple in data packets of a service may be statically defined and a corresponding static UL packet filter 62, 64 may be used in the user equipment 10. Again, it is to be understood that the signalling path 4 is schematically represented as extending to the user equipment 10 directly from a specific network node, e.g. from the policy controller 30 as illustrated, but typically may be implemented via other network nodes. For example, in an UMTS communication network, the signalling path 2 could extend from a Serving GPRS Support Node (SGSN) to the user equipment 10. In a Long Term Evolution/Service Architecture Evolution (SAE/LTE) communication network, the signalling path 2 could extend from a Mobility Management Entity (MME) to the user equipment 10. These network nodes may in turn receive the signalling information from other network nodes, e.g. the policy controller 30.

In some embodiments, the mobile communication network can signal to the user equipment 10 whether the mirroring function 220 should be applied or not, e.g. using standardized bearer establishment or modification procedures as defined in the 3GPP specifications. A corresponding information element for this purpose could be added to the standardized bearer establishment or modification procedures. In such cases, the signalling from the user equipment 10 to the mobile communication network that the mirroring function 220 is supported could be implemented on a per bearer basis as well. That is to say, the corresponding signalling could specify support of the mirroring function 220 for a new bearer or could modify the support information for an already established bearer.

Figure 8:
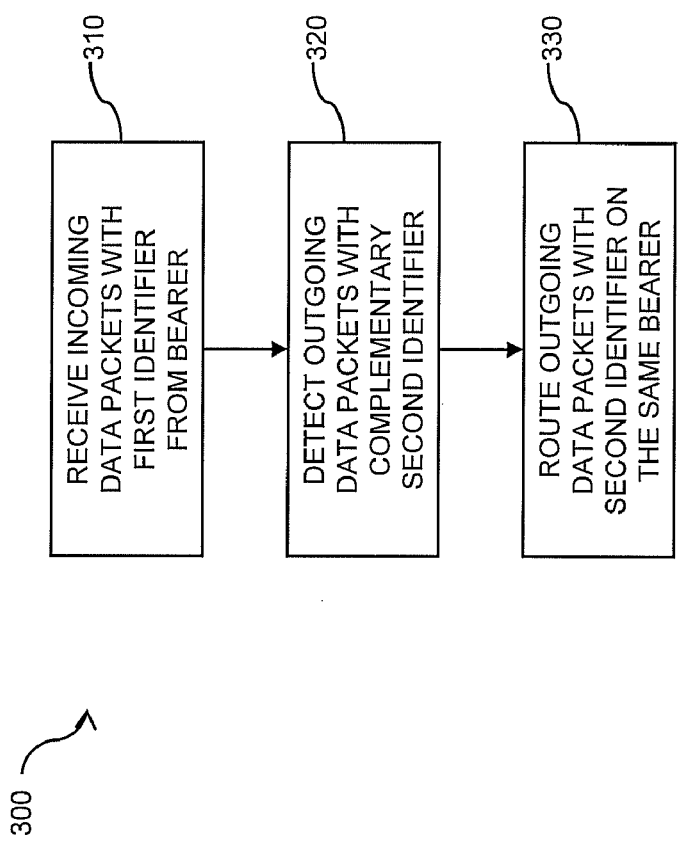
FIG. 8 shows a flowchart for illustrating a method of handling UL data traffic according to an embodiment of the invention.

FIG. 8 shows a flowchart illustrating a method 300 for handling UL data traffic in accordance with the above-mentioned concepts.

In step 310, incoming data packets with a first identifier are received from a bearer. As explained above, the bearer may be associated with a corresponding QoS class, and the first identifier may be an IP 5-tuple.

In step 320, outgoing data packets with a complementary second identifier are detected. This may be accomplished by generating or configuring a "mirrored" UL packet filter which operates on the basis of an IP 5-tuple which is complementary to the IP 5-tuple in the incoming data packets received from the bearer.

In step 330, outgoing data packets with the second identifier are routed to the same bearer from which the incoming data packets with the first identifier are received. Again, this may be accomplished by selecting or configuring a corresponding "mirrored" UL packet filter, e.g. operating on the basis of the complementary identifier or a part thereof.

According to the concepts as explained above, it is possible to dynamically map service-related data traffic to a desired QoS class, e.g. on the basis of user-specific policy data and/or on the basis of service-specific policy data. Further, this mapping could be dependent on the time of day, the day of week or other parameters. A variety of different policies may thus be defined in the policy data for controlling the mapping of the service-related data traffic to a QoS class. One such policy may even be to block data traffic relating to a specific service in the gateway.

Further, the control of QoS on the basis of policy data can be achieved in an efficient manner, without requiring excessive signalling on core network interfaces or to the user equipment. When combining the concepts of handling DL data traffic as explained in connection with FIGS. 1-5 with the concepts of handling UL data traffic as explained in connection with FIGS. 6-8, an efficient solution is obtained which allows for handling both DL data traffic and UL data traffic.

Moreover, the concepts as described above do not rely on establishing bearers which are not needed. Rather, bearers may be established as needed, thereby efficiently using available network resources.

It is to be understood that the concepts as explained above are merely exemplary and susceptible to various modifications. For example, the network nodes as illustrated in FIGS. 1 and 6 need not be implemented as separate nodes, but may be integrated into a single network component. For example, the packet inspector 100 could also be integrated in the gateway 26. The concepts may be applied in various types of mobile communication networks. Finally, it is to be noted that the solution for handling UL data traffic as explained in connection with FIGS. 6-8 is not limited to handling UL data traffic from a user equipment. Rather, these concepts can be generally applied to all situations in which incoming data packets are already mapped to a specific bearer and there are corresponding outgoing data packets.

The invention claimed is:

1. A method of handling network traffic, comprising:
   receiving incoming data packets of a specific service from one of a plurality of bearers, the data packets including a first identifier indicating a source and a destination;
   detecting outgoing data packets of said specific service that each include a complementary second identifier indicating the source of the first identifier as a destination of the outgoing data packet;
   responsive to detecting a new packet flow in said received incoming data packets, automatically generating a packet filter configured to route the detected outgoing data packets having said complementary second identifier to the same bearer from which the incoming data packets having said first identifier are received; and
   routing the detected outgoing data packets having said complementary second identifier in accordance with the automatically generated packet filter;
   wherein at least one of said detecting and said routing of the outgoing data packets is selectively activated on the basis of a control signal.

2. The method according to claim 1, wherein the bearers are each associated with a corresponding Quality of Service class.

3. The method according to claim 1, further comprising indicating to a network component that a communication device receiving said incoming data packets supports said detecting and said routing of the outgoing data packets.

4. The method according to claim 1, wherein said first identifier is a first Internet Protocol 5-tuple including a source address and a destination address, and wherein said complementary second identifier is a complementary Internet Protocol 5-tuple including a source address equal to the destination address of the first Internet Protocol 5-tuple and a destination address equal to the source address of the first Internet Protocol 5-tuple.

5. A communication device, comprising a receiver configured to receive incoming data packets from a plurality of bearers, a transmitter configured to send outgoing data packets on said plurality of bearers, and a mirroring function configured to:
   detect incoming data packets of a specific service that each include a first identifier indicating a source and a destination,
   detect outgoing data packets of said specific service that each include a complementary second identifier indicating the source of the first identifier as a destination of the outgoing data packet,
   responsive to detecting a new packet flow in said detected incoming data packets, automatically generate a packet filter configured to route the detected outgoing data packets having said complementary second identifier to the same bearer from which the incoming data packets having said first identifier are received; and
   route the detected outgoing data packets having said complementary second identifier in accordance with the automatically generated packet filter;
   selectively activate at least one of said detection and said routing of the outgoing data packets on the basis of a control signal.

6. The communication device according to claim 5, wherein the communication device is a user equipment.

7. The communication device according to claim 5, wherein the bearers are each associated with a corresponding Quality of Service class.

8. The communication device according to claim 5, further configured to indicate to a network component that the communication device supports said detection and said routing of the outgoing data packets.

9. The communication device according to claim 5, wherein said first identifier is a first Internet Protocol 5-tuple including a source address and a destination address, and wherein said complementary second identifier is a complementary Internet Protocol 5-tuple including a source address equal to the destination address of the first Internet Protocol 5-tuple and a destination address equal to the source address of the first Internet Protocol 5-tuple.

* * * * *